United States Patent [19]

Bartenbach

[11] Patent Number: 4,522,467

[45] Date of Patent: Jun. 11, 1985

[54] WINDOW HAVING SUNSHADE PRISMATIC BARS

[76] Inventor: Christian Bartenbach, Rinnerstrasse 39, A-6020 Innsbruck-Aldrans, Austria

[21] Appl. No.: 504,059

[22] PCT Filed: Sep. 20, 1982

[86] PCT No.: PCT/DE82/00203

§ 371 Date: May 20, 1983

§ 102(e) Date: May 20, 1983

[87] PCT Pub. No.: WO83/01085

PCT Pub. Date: Mar. 31, 1983

[30] Foreign Application Priority Data

Sep. 25, 1981 [DE] Fed. Rep. of Germany ....... 3138270
Jul. 20, 1982 [DE] Fed. Rep. of Germany ....... 3227118

[51] Int. Cl.[3] ............ G02B 27/00
[52] U.S. Cl. ............ 350/263
[58] Field of Search ............ 350/263, 258, 259

[56] References Cited

U.S. PATENT DOCUMENTS

| | | | |
|---|---|---|---|
| 3,443,860 | 5/1969 | Luboshez | 350/263 |
| 4,130,351 | 12/1978 | Luboshez | 350/263 |

FOREIGN PATENT DOCUMENTS

| | | |
|---|---|---|
| 2699777 | 1/1979 | Austria . |
| 831449 | 2/1952 | Fed. Rep. of Germany . |
| 2615379 | 10/1977 | Fed. Rep. of Germany . |
| 2185743 | 1/1974 | France . |
| 2463254 | 2/1981 | France . |

*Primary Examiner*—Richard A. Wintercorn
*Attorney, Agent, or Firm*—Hill, Van Santen, Steadman & Simpson

[57] ABSTRACT

With roof windows of any inclination and orientation, it should be possible to adjust the sunshade effect throughout the year and to have at the same time a good transparence to daylight. For this purpose, there is used a prismatic plate, flat at the outside, and which is provided at the inside with parallel prismatic bars having a surface free of a reflecting layer on a right angle side. According to the invention, the other surface on the other side is provided with a reflecting layer and forms with the non-reflecting surface a right angle. Furthermore, the prismatic bars are arranged perpendicularly to the intersection line which is defined by the intersection plane with which the solar beams, during the longest day, form the maximum incidence angle $\psi_{max}$ with respect to the plane of the window. For the angle $\alpha$ of the base of the non-reflecting surface, a value may be selected with which there is obtained a sunshade effect and at the same time optimum conditions of transparency to daylight.

5 Claims, 3 Drawing Figures

WINDOW HAVING SUNSHADE PRISMATIC BARS

BACKGROUND OF THE INVENTION

The invention relates to a skylight or attic roof window wherein a plane of the window is provided at a prescribed angle of inclination with the horizontal. A prismatic plate is disposed parallel to the window plane in an opening of the window.

SUMMARY OF THE INVENTION

Given a window having a prescribed inclination and alignment, an object of the invention is to avoid the passage of solar rays in an exclusion time interval of a reference day without seriously affecting the light transmission otherwise more than necessary. In particular, the exclusion area should be no greater than is required to completely block out the sun in an exclusion area of the prismatic plate of the reference day.

According to the invention, the prismatic plate has a planar base surface toward an outside of the window and prismatic rods next to and parallel to one another at an inside of the window. The prismatic rods extend over an entire opening of the window and have an unmirrored face enclosing an acute base angle with the base surface. A mirrored face of each prismatic rod is provided and is perpendicular to the unmirrored face. The prismatic rods are disposed such that a point of an angle of elevation of solar rays measured relative to the window plane in a reference plane perpendicular thereto points to a mirrored face given a highest solar altitude to be blocked out. The base angle between the unmirrored face and the base surface of each prismatic rod is selected of such size that the window transmits substantially no sunbeams in an exclusion time interval on a prescribed reference day. The invention is based on the observation that the blocking curve of such a window in a solar irradiation diagram proceeds similarly to the orbital curves of the sun, that moreover, the center line of the blocking curve can be pivoted with respect to the center line of the solar path by means of a suitable selection of the axial angle of the prismatic bars, and that the blocking curve can be brought very close to the orbital curve by means of a corresponding selection of the base angle of the prismatic bars. A minimization of the surface between the blocking curve and the oribital curve is therefore possible, so that the window transmits a maximum of daylight.

As a rule, the longest day of the year having the highest possible solar altitude is selected as the reference day for the blocking condition. A complete blocking of the sun is then guaranteed during the entire year.

BRIEF DESCRIPTION OF THE DRAWINGS

The invention is explained in greater detail with reference to the figures.

DESCRIPTION OF THE PREFERRED EMBODIMENTS

Figure 1:
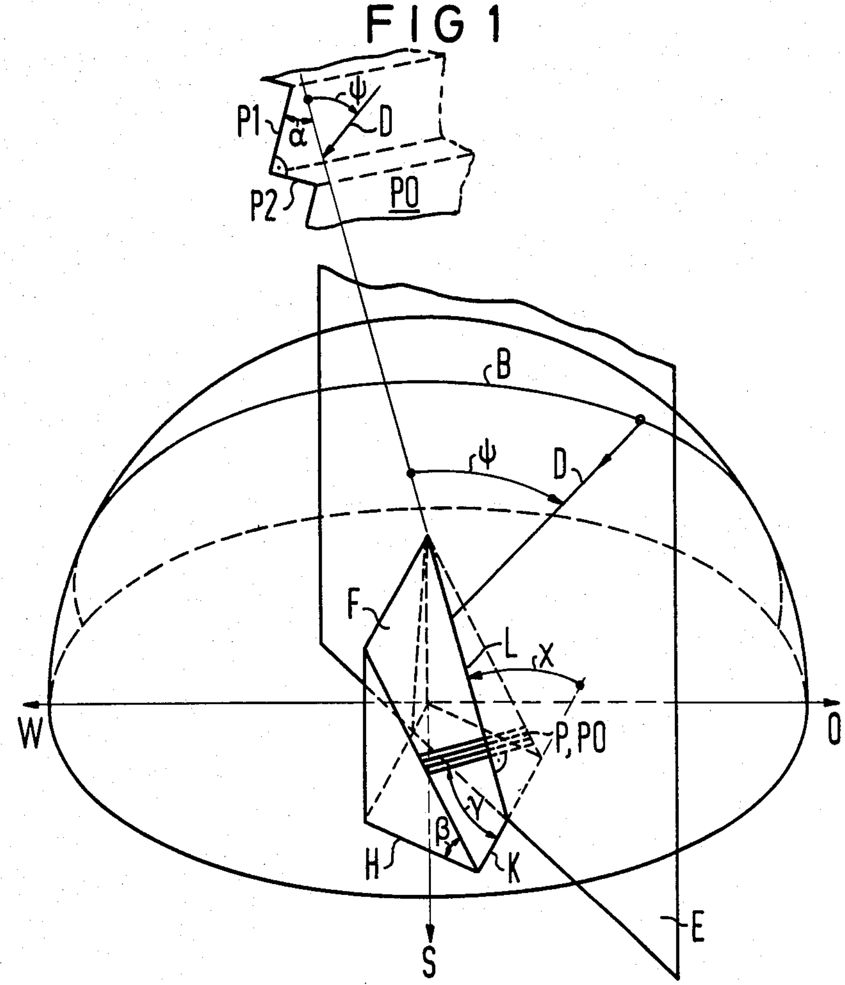
FIG. 1 illustrates a schematic representation of a window with specification factors useful in defining the invention.

A skylight or attic window having the window area F is schematically illustrated in FIG. 1, whereby said window area is inclined by the angle $\beta$ relative to the horizontal plane H and is aligned southeast in the specified manner. The window area F is filled by a prismatic plate which exhibits a planar base surface P0 at the outside and continuously adjacent solid prismatic rods P having the short faces P1 and P2 proceeding at right angles relative to one another at the inside (cf. the enlarged cross-section in the extension of the section line L in FIG. 1).

The longitudinal axes of the prismatic rods P are aligned perpendicularly relative to a section line L and thus enclose an axial angle $\gamma$—measured in the window plane F—with the horizontal limiting edge K. The section line L is given by the intersection of the window area F with that reference plane E perpendicular to it in which the greatest solar angle of elevation occurs on the reference day and within the exclusion area, namely measured in the reference plane E relative to the section line L. The orbital curve of the sun on the reference day is referenced B in FIG. 1.

One of the short faces, namely P2 of the prismatic rods P' is mirrored at the inside. The prismatic rods are disposed such that the tip of the greatest angle of elevation $\psi_{max}$ points to the mirrored short face P2.

Figure 2:
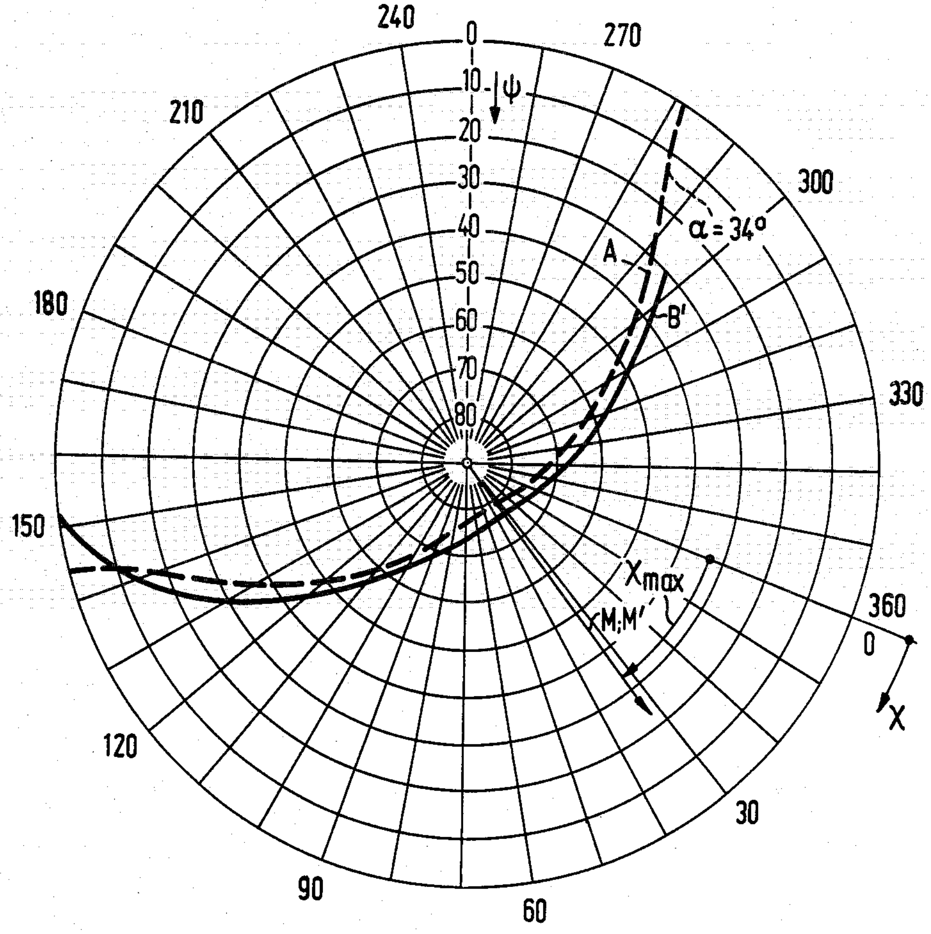
FIG. 2 illustrates a solar irradiation diagram with orbital curve B' and blocking curve A.

FIG. 2 qualitatively shows the course of the solar path B'. It specifies the respective angle of elevation $\psi$ of a sunbeam D measured in the reference plane perpendicular to the window plane E dependent on the angle $\chi$ of the section line L of said reference plane to the window plane measured relative to the horizontal edge K (in accordance with the definitions of the reference plane E in FIG. 1).

The greatest angle of elevation $\psi_{max}$ and the angle $\chi_{max}$ of the corresponding reference plane in which the greatest angle of elevation occurs can be read from FIG. 2. The optimum axial angle $\gamma$ of the prismatic rods is thus already determined.

Figure 3:
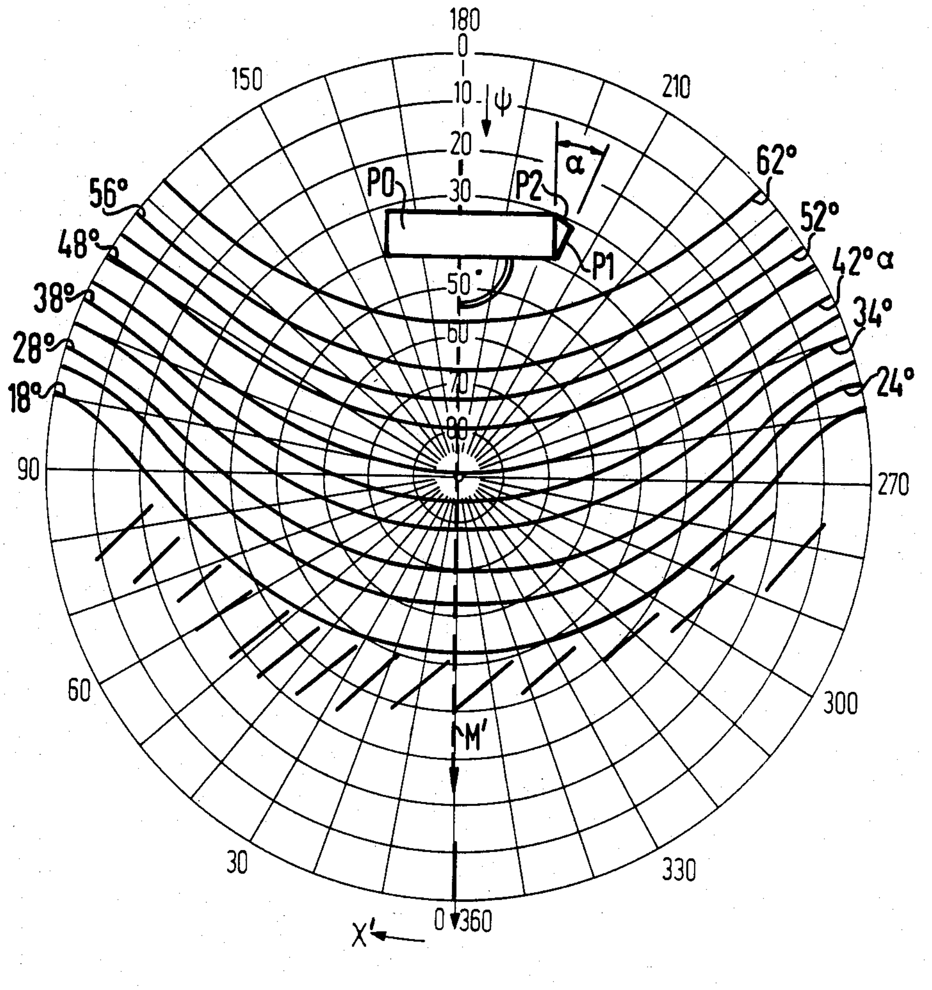
FIG. 3 illustrates a multitude of blocking curves through a prismatic rod with variable base angle.

The blocking curve A—at least in the desired exclusion time interval—must now proceed above the orbital curve B'. The overall region below the blocking curve A is then the exclusion area in which the prismatic plate does not transmit any light. That part of this exclusion area above the orbital curve B' of the reference day should therefore be as little as possible so that as much daylight as possible is transmitted. This is possible by means of a suitable selection of the base angle $\alpha$ of the prismatic rods. For this purpose the blocking curves of prismatic rods having different base angles according to FIG. 3 are recorded and are then compared to the orbital curves to be blocked out, whereby the curve group according to FIG. 3 is rotated such that the bisecting line M' coincides with the bisecting line M of the orbital curve B' in FIG. 2. The two diagrams are then directly comparable because—for the same reference angle $\chi$ of the reference plane E—they reproduce the angle of elevation $\psi$ of the sun in this reference plane on the one hand and, on the other hand, reproduce the blocking angle of a prismatic rod P proceeding perpendicularly relative to said reference plane E.

Only the blocking curve A lying closest to the orbital curve B' need therefore now be sought, a base angle $\alpha$ of 34° being allocated thereto in this case. The distance between the blocking curve and the orbital curve could obviously be further reduced by means of selecting an even somewhat lower base angle.

Although various minor changes and modifications might be proposed by those skilled in the art, it will be understood that I wish to include within the claims of the patent warranted hereon all such changes and modifications as reasonably come within my contribution to the art.

I claim as my invention:

1. A window, comprising: a plane of the window being provided at a prescribed angle of inclination ($\beta$) with the horizontal; a prismatic plate disposed parallel to the window plane and which exhibits a planar base surface toward an outside of the window and solid prismatic rods next to and parallel to one another as an integral part of the plate at an inside of the window, said prismatic rods extending over an entire opening of the window; an unmirrored face of each prismatic rod enclosing an acute base angle ($\alpha$) with the base surface; a mirrored face of each prismatic rod being provided and being perpendicular to the unmirrored face; the prismatic rods being disposed such that a point of an angle of elevation ($\psi$) of solar rays measured relative to the window plane in a reference plane perpendicular thereto points to the mirrored face given a highest solar altitude to be blocked out; and the base angle ($\alpha$) between the unmirrored face and the base surface of each prismatic rod being selected of such magnitude that the window transmits substantially no sunbeams in an exclusion time interval on a prescribed reference day.

2. A window comprising: a plane of the window being provided at a prescribed angle of inclination ($\beta$) with the horizontal; a prismatic plate disposed parallel to the window plane and which exhibits a planar base surface toward an outside of the window and prismatic rods next to and parallel to one another at an inside of the window, said prismatic rods extending over an entire opening of the window; an unmirrored face of each prismatic rod enclosing an acute base angle ($\alpha$) with the base surface; a mirrored face of each prismatic rod being provided and being perpendicular to the unmirrored face; the prismatic rods being disposed such that a point of an angle of elevation ($\psi$) of solar rays measured relative to the window plane in a reference plane perpendicular thereto points to the mirrored face given a highest solar altitude to be blocked out; the base angle ($\alpha$) between the unmirrored face and the base surface of each prismatic rod being selected of such magnitude that the window transmits substantially no sunbeams in an exclusion time interval on a prescribed reference day; the axial angle between the prismatic rods and a section line in the window plane amounting to $90° \pm 15°$, whereby the section line is determined by that reference plane in which the greatest angle of elevation ($\psi_{max}$) appears on the reference day.

3. A window according to claim 2 wherein a base angle ($\alpha$) of the prismatic bars is provided such that the surface between an optical curve of the sun and a blocking curve of the prisms has a smallest possible value in a solar irradiation diagram in the exclusion time interval of the reference day.

4. A window according to claim 1 wherein the reference day is the longest day of the year.

5. A window according to claim 2 wherein the axial angle between the prismatic rods and the section line is $90° \pm 5°$.

* * * * *